(12) United States Patent
Miller et al.

(10) Patent No.: US 7,862,013 B2
(45) Date of Patent: Jan. 4, 2011

(54) PACKING ELEMENT FOR USE IN A CHEMICAL PROCESSING APPARATUS

(75) Inventors: Robert L. Miller, Stow, OH (US); Hassan S. Niknafs, Stow, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 1022 days.

(21) Appl. No.: 11/583,226

(22) Filed: Oct. 19, 2006

(65) Prior Publication Data

US 2008/0093751 A1      Apr. 24, 2008

(51) Int. Cl.
    *B01F 3/04*      (2006.01)
(52) U.S. Cl. .................................. 261/94; 261/DIG. 72
(58) Field of Classification Search .................... 261/94, 261/95, 97, 100, 103, 112.1, DIG. 72
    See application file for complete search history.

(56) References Cited

U.S. PATENT DOCUMENTS

| | | | | |
|---|---|---|---|---|
| 1,173,187 | A * | 2/1916 | Hechenbleikner | 261/94 |
| 4,382,046 | A * | 5/1983 | Frohwerk | 261/94 |
| 4,510,261 | A * | 4/1985 | Pereira et al. | 502/304 |
| 5,304,423 | A * | 4/1994 | Niknafs et al. | 428/402 |
| D381,394 | S * | 7/1997 | Lex et al. | D23/209 |
| 5,688,444 | A * | 11/1997 | Koshy | 261/94 |
| 6,007,915 | A * | 12/1999 | Rukovena | 428/397 |
| D465,257 | S * | 11/2002 | Van Olst et al. | D23/207 |
| 6,889,963 | B2 * | 5/2005 | Niknafs et al. | 261/94 |
| 7,566,428 | B2 * | 7/2009 | Warner et al. | 422/211 |
| 2003/0160342 | A1* | 8/2003 | Niknafs et al. | 261/94 |
| 2004/0166284 | A1 | 8/2004 | Niknafs | |
| 2005/0212153 | A1* | 9/2005 | Niknafs et al. | 261/94 |
| 2006/0204414 | A1 | 9/2006 | Warner | |

FOREIGN PATENT DOCUMENTS

| | | |
|---|---|---|
| WO | 9409901 A | 5/1994 |
| WO | 2005021152 A | 3/2005 |

OTHER PUBLICATIONS

International Search Report and Written Opinion for International Application PCT/US2007/022367. Mailed Jan. 29, 2008.
Response to Written Opinion for International Application PCT/US2007/022367. Filed Aug. 18, 2008.
International Preliminary Report on Patentability for International Application PCT/US2007/022367. Completed Nov. 18, 2008.

* cited by examiner

*Primary Examiner*—Scott Bushey
(74) *Attorney, Agent, or Firm*—Stewart A. Fraser; Thomas G. Field, III

(57) ABSTRACT

A chemical processing apparatus that utilizes randomly oriented ceramic packing elements having at least three openings therethrough that accommodate feedstock with combustible and/or noncombustible matter that accumulates in the openings is described. The openings occupy at least 10% of the surface area on one side of the packing element.

45 Claims, 5 Drawing Sheets

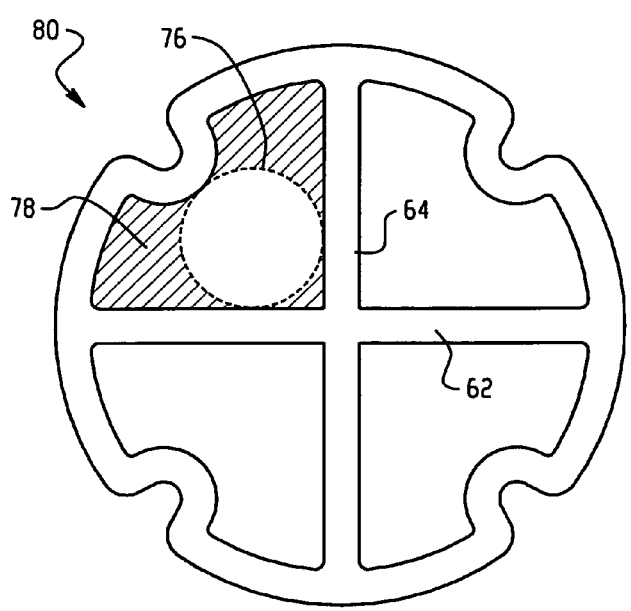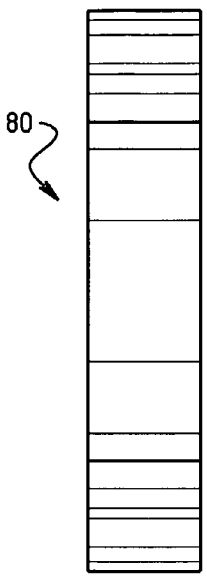
Fig. 6     Fig. 7
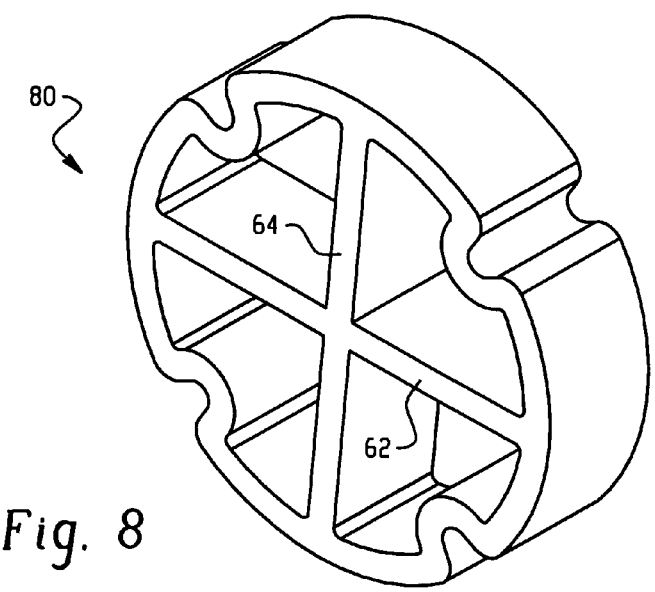
Fig. 8

PACKING ELEMENT FOR USE IN A CHEMICAL PROCESSING APPARATUS

BACKGROUND OF THE INVENTION

This invention generally relates to randomly oriented packing elements used to facilitate heat transfer or mass transfer in a chemical processing apparatus. More specifically, this invention relates to randomly oriented ceramic packing elements that are used en masse to facilitate heat transfer within a thermal oxidizer that combusts a portion of the feedstock while a noncombustible material, which may be incorporated as a solid in the feedstock or generated in situ, adheres to and accumulates upon the surface of the media.

The packing elements may be designed to: maximize surface area; maintain dimensional stability during exposure to high temperatures; and be structurally designed to prevent crushing during use. Furthermore, the environment in which the packing elements are used may be corrosive due to exposure to a strong acid or strong base. The packing elements may be made from a ceramic material that is thermally stable, resistant to corrosive environments and can be mass produced in appropriate shapes.

BRIEF SUMMARY OF THE INVENTION

The inventors have discovered that ceramic packing elements having certain structural characteristics can substantially increase the amount of time that the packing elements operate efficiently in a chemical processing apparatus. Such packing elements may contain passageways that cannot be quickly obstructed by a contaminant that accumulates on the packing elements after incorporation in the apparatus via the feedstock and/or is generated in situ.

In one embodiment, this invention is a ceramic packing element comprising a width to length ratio between 2:1 and 20:1, at least three sides, and at least three continuous passageways disposed through the element. The passageways define at least three openings in a first of the sides and each opening occupies at least 10% of the first side's surface area.

In another embodiment, this invention may be a chemical processing apparatus comprising a plurality of randomly oriented disc shaped ceramic packing elements. The majority of the elements each comprise a width to length ratio between 2:1 and 20:1, at least three sides, and at least three continuous passageways disposed through the element. The passageways define at least three openings in a first of the sides and each opening occupies at least 10% of the first side's surface area.

In yet another embodiment, this invention may be a process for treating a fluid. The process may include, in a first step, injecting the fluid into a chemical processing apparatus comprising a plurality of randomly oriented ceramic packing elements each having a width to length ratio between 2:1 and 20:1, at least three sides, and at least three continuous passageways disposed through the element. The passageways define at least three openings in a first of the sides and each opening occupies at least 10% of the first side's surface area. The process may also include heating the fluid to a temperature sufficient to generate combustible byproducts and then removing the byproducts from the chemical processing apparatus.

BRIEF DESCRIPTION OF THE DRAWINGS

FIG. 6 is a top view of a second ceramic packing element of this invention;

FIG. 7 is a side view of a second ceramic packing element of this invention;

FIG. 8 is a perspective view of a second ceramic packing element of this invention;

DETAILED DESCRIPTION OF THE INVENTION

Figure 1:
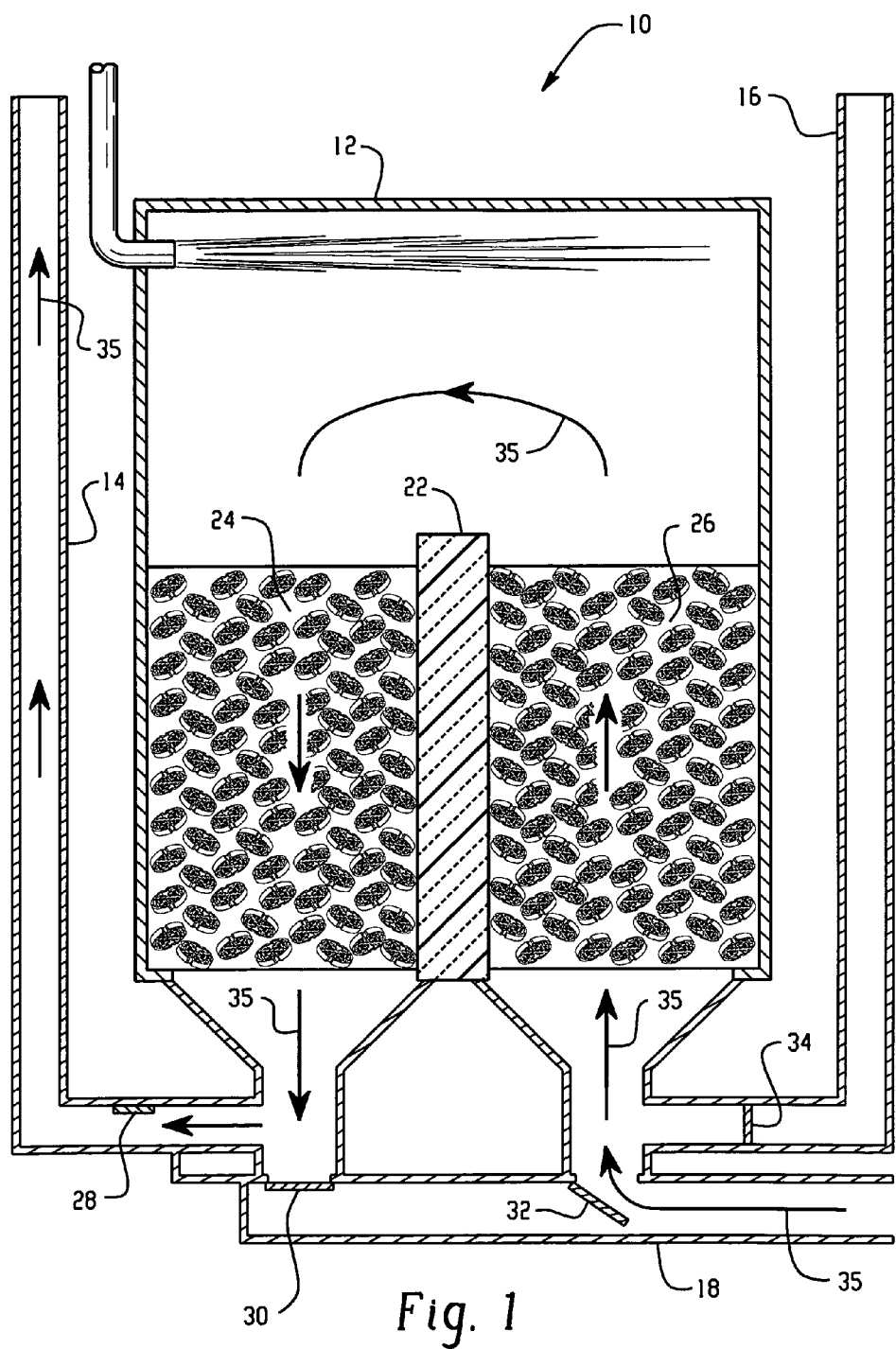
FIG. 1 is a simplified cross-sectional view of a thermal oxidizer with fluid flowing in a first direction.

As used herein, the phrase "chemical processing apparatus" is intended to describe equipment, such as tanks, burners, combustion chambers, piping, etc., that receives a raw material and then chemically and/or physically converts it to an end product that is discharged from the apparatus. The conversion may involve a chemical reaction, a physical change (e.g., liquid to gas) to the raw material's state of matter and/or an increase or decrease in the temperature of the raw material. Chemical reactors, such as thermal oxidizers, are widely used in chemical manufacturing industries for a variety of purposes and are considered to be a subset of the phrase chemical processing apparatus.

Chemical processing apparatuses that use ceramic packing elements to facilitate heat transfer during a chemical reaction are known. In some commercial embodiments, each packing element contains multiple passages which simultaneously provide passageways through the packing element sufficient geometric surface area to facilitate the desired transfer of heat. The packing element may perform as desired when the feedstock coming into the apparatus does not contain a significant quantity of particulate matter that could plug the passageways. However, if the feedstock contains particulate matter that does plug the passageways, the blocked passageways impede the flow of feedstock into the apparatus and/or the flow of by-products from the apparatus. Furthermore, if the feedstock contains an element or compound in a solid, liquid or gaseous form that can react with another element or compound to form a nonvolatile residue under reaction conditions within the apparatus, the residue may accumulate on the surface of the packing elements. The accumulation of contaminating material slows the flow of feedstock through the reactor resulting in an unacceptable increase in pressure drop which may lead to a decrease in the efficiency of the reactor and/or, in the worst case, shutting down the reactor which is undesirable. Ideally, the use of packing elements that would never need to be cleaned and/or replaced is desired but not yet attainable. Instead, operators of chemical processing apparatuses strive to increase the time that the packing elements can remain in an apparatus before it must be shut down for maintenance. For example, if the average time between shutting down the reactor for removal and replacement of the packing elements can be increased from once every three months to one every six months, the economic performance of the apparatus can be improved.

Ceramic packing elements are used in a wide variety of chemical processing apparatuses, such as a thermal oxidizer, wherein the packing elements participate in the transfer of heat during the process cycle. In the context of the thermal oxidizer, the packing elements, which may be collectively referred to herein as "packing", are usually ceramic components that are designed to simultaneously provide a sufficient amount of geometric surface area to facilitate the efficient transfer of heat to and from the packing elements and, at the same time, provide a sufficient number of passageways through the packing elements to ensure that the flow of the feedstock or byproducts through the packing is not unduly inhibited. If the packing has too little geometric surface area, the thermal efficiency of the oxidizer may be too low such that operation of the oxidizer in a cost effective manner may not be possible. If the packing has sufficient surface area but the openings through the packing are too small, the pressure drop in the reactor may be too high which may cause the reactor to be shut down. In applications where the heat storage capacity of the packing is important, the mass, specific heat capacity and thermal conductivity of the packing may be tailored to allow the chemical processing apparatus to meet its design objectives. The mass of a packing element is a function of the element's three dimensional design. The specific heat capacity and thermal conductivity are functions of the packing element's material composition.

In order to minimize the cost of operating a thermal oxidizer, heat transfer packing elements are used to conserve energy by absorbing heat that is generated during one portion of the process cycle and then releasing it for use at a later time in the process cycle. As used herein, heat transfer means moving heat from one material to another, such as, for example, extracting heat from one flow of material and then releasing the captured heat into a different flow of material. Typically, the packing elements include a plurality of shaped ceramic components that were formed and then sintered in a kiln. The packing elements may be chemically and physically stable when subjected to the high temperatures, rapid changes in pressure and/or an aggressive chemical environment.

The packing elements of the invention can be formed from any material that provides sufficient strength and is compatible with the materials disposed in the chemical processing apparatus. For example, ceramic materials such as natural or synthetic clays, feldspars, zeolites, cordierites, aluminas, zirconia, silica or mixtures of these may be used. Clays are generically mixed oxides of alumina and silica and include materials such as kaolin, ball clay, fire clay, china clay, and the like. Example clays are high plasticity clays, such as ball clay and fire clay. The clay may have a methylene blue index, ("MBI"), of about 11 to 13 meq/100 gm. The term "feldspars" is used herein to describe silicates of alumina with soda, potash and lime. Other components such as quartz, zircon sand, feldspathic clay, montmorillonite, nepheline syenite, and the like can also be present in minor amounts of the other ceramic-forming components.

Components fired together to produce the packing elements may be supplied in fine powder form and may be made into a shapeable mixture by the addition of a liquid, such as water, and optional processing aids, such as bonding agents, extrusion aids, lubricants, and the like to assist in the extrusion process. The mixture can be processed using several different techniques, such as extrusion or pressing, to achieve the desired shape. For example, an initial extrusion process may be followed by cutting perpendicular to the direction of extrusion to obtain the desired lengths. An initial drying may be used to drive off water. This may avoid disrupting the relatively weak structure of the greenware and may be carried out at below about 120° C. and, in one embodiment, below about 70° C. and may last for about 5 hours. The bodies may then be processed at high temperatures wherein the maximum temperature may be greater than 1100° C. and less than 1400° C. Maximum firing temperatures between 1200° C. and 1250° C. are common. The firing temperature may depend, to some degree, on the composition of the elements, and in general, may be sufficient for the bulk of the material to achieve a structurally sound body.

The ceramic elements may be fabricated from a mixture of clays and feldspars and other minor ingredients to form a resultant body that is comprised mainly of silicon oxide and aluminum oxide (an aluminosilicate). For example, the mixture used to form the elements may comprise at least about 90% of ceramic forming ingredients and the balance (typically up to about 10%) of processing aids. The ceramic forming ingredients may comprise 20-99% aluminum oxide and 0-80% silicon oxide. The processing aids may be largely volatilized during firing. It will be appreciated, however, that the packing elements can be composed of any material that is inert to the material disposed in the processing apparatus and provides sufficient crush strength to prevent crushing of the packing elements when they are dumped into the apparatus. The components may be thoroughly mixed before water is added in an amount sufficient to enable the mixture to be shaped into the desired form and to retain that form during firing. Generally, the amount of water added may be from 12 to 30 ml for every 100 gm of the dry mixture of the components. The shapeable mixture can then be molded, or extruded to form the desired shape before the shape is fired in a kiln to a maximum temperature of from 1100° C. to 1400° C. The temperature in the kiln may be increased at a rate of between 50 to 90° C/hr. and the dwell time at the calcining temperature may be from 1 to 4 hrs before the kiln is allowed to cool to ambient temperatures.

Chemical processing apparatuses may employ a single collection of packing elements comprising, in some cases, thousands of individual pieces of the ceramic packing elements, or the equipment may utilize two or more separate beds of packing in individual compartments. A bed of packing may be referred to herein as a "collection" of packing. Thermal oxidizers, for example, are a well known category of chemical processing apparatuses that utilize two separate collections of ceramic packing elements to transfer heat within the oxidizer. Three well known classes of thermal oxidizers are: regenerative thermal oxidizers (RTO), which utilize an open flame to heat the combustion zone; flameless thermal oxidizers (FTO); and regenerative catalytic oxidizers (RCO). Thermal oxidizers are used in a variety of industrial processes including the destruction of harmful organic compounds such as volatile organic compounds (VOC). The feedstock is typically a fluid, which may be a liquid or vapor, that contains air and small quantities of organic compounds that can be readily destroyed by heating the feedstock in a thermal oxidizer. The feedstock is destroyed in combustion zones that oxidize the organic compounds. However, depending upon the source of the feedstock, certain elements and/or compounds that are not combusted are included in the feedstock. The elements and/or compounds may not be destroyed in the combustion zone because they are not combustible either at or below the thermal oxidizer's maximum operating temperature.

For example, silicon containing compounds are included in the waste effluent generated by some industrial processes. The effluent from the industrial process is the fluid feedstock that is fed into a thermal oxidizer to enable destruction of the combustible organic compounds. However, when a silicon containing compound is heated to a sufficiently high temperature, the silicon may be oxidized thereby forming silica which may be deposited or precipitated onto the surface of the packing elements. The silica may then accumulate on the packing elements' interior and exterior surfaces thereby forming a coating which may reduce the air flow through the packing and eventually plug the packing so that essentially no feedstock flows through the apparatus. As the packing's passageways becomes progressively more plugged, the pressure drop across the bed of packing may become higher than desired and the thermal oxidizer may be shut down so that the packing can be cleaned or replaced to reduce the pressure drop to an acceptable level.

In the Figures described herein, a part number may be used to identify the same element in different drawings unless otherwise noted.

Referring now to the drawings and more particularly to FIG. 1, there is shown a cross-sectional view of a chemical processing apparatus 10, illustrated by way of example here as a thermal oxidizer, according to one embodiment of this invention. Beginning with the exterior of the oxidizer, the oxidizer's components may include housing 12, exhaust stacks 14 and 16, and inlet manifold 18. Disposed within the housing may be burner 20, insulating wall 22, a first bed of heat exchange packing elements 24 and a second bed of heat exchange packing elements 26. Valves 28, 30, 32 and 34 may be used to control the flow of volatile organic compounds (VOC) into the thermal oxidizer and the flow of oxidized by-products out of the thermal oxidizer. The material flowing into the thermal oxidizer may be considered to be a raw material. In one embodiment, the thermal oxidizer may be used to convert a VOC to one or more compounds that can be safely released to the environment. The thermal oxidizer may use any heat source sufficient to produce the desired oxidation. For example, a thermal oxidizer may be designed to use a fuel source, such as natural gas, to generate the heat needed to destroy a VOC. While the heat entrained in the oxidizer's byproducts could be allowed to flow through the oxidizer, the cost effectiveness of the thermal oxidizer's operation may be improved significantly if heat exchange packing elements are used to capture and utilize the heat that would otherwise be wasted.

Figure 2:
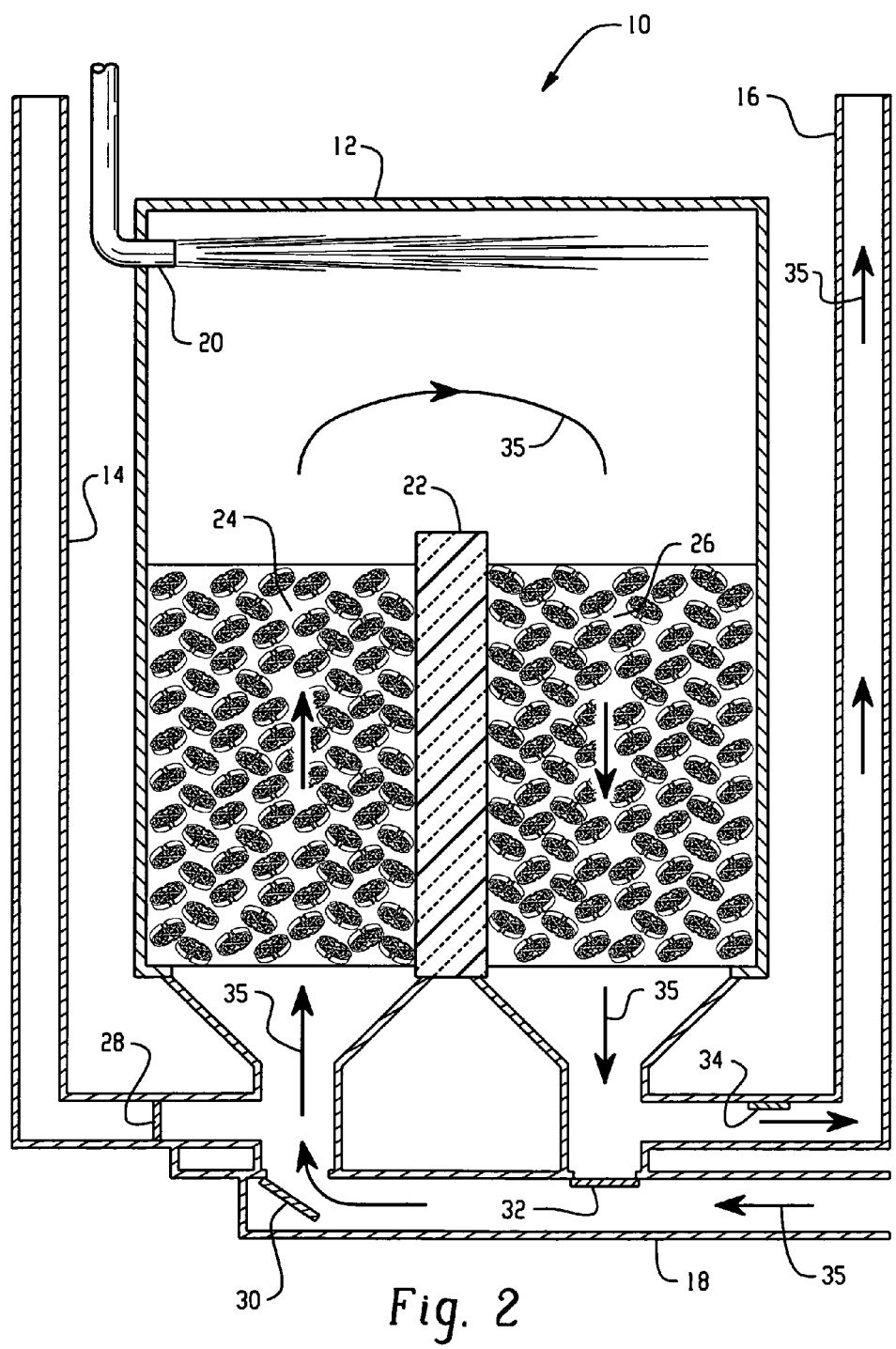
FIG. 2 is a simplified cross-sectional view of a thermal oxidizer with fluid flowing in a second direction.

The operation of a thermal oxidizer using ceramic packing elements according to one embodiment of this invention will now be explained. FIG. 1 represents a first portion of the process cycle in which valves 28 and 32 are opened and valves 30 and 34 are closed thereby controlling the flow of the VOC from the inlet manifold, through the thermal oxidizer and out of the thermal oxidizer via the exhaust stack 14. See arrows 35 in FIG. 1. As the VOC flows through the thermal oxidizer it is heated thereby converting the VOC to other compounds that can be safely discharged into the environment. As the heated gaseous byproducts flow through the first bed of heat exchange packing elements 24 and out of exhaust stack 14, the heat in the combustion products is absorbed by packing elements 24. With reference now to FIG. 2, after a predetermined period of time, valves 28 and 32 are closed and valves 30 and 34 are opened thereby forcing the stream of VOC to enter the thermal oxidizer by flowing through the heated first bed of heat exchange packing elements which releases the heat that had been captured in the first portion of the process cycle thereby increasing the temperature of the VOC before it reaches the burner. By using the captured heat to preheat the VOC, the amount of energy needed to combust the VOC is reduced thereby reducing the cost of operating the oxidizer. As the heated byproducts flow through the second collection of heat exchange packing elements 26, some of the entrained heat is extracted by the packing elements 26 and the byproducts exit the oxidizer's housing via exhaust stack 16. The thermal oxidizer continues to operate by once again closing valves 30 and 34 while opening valves 28 and 32 thereby forcing the VOC to flow through the second collection of heat transfer packing elements where the VOC is preheated before flowing past the burner. By cycling back and forth between the process steps represented by FIGS. 1 and 2, the thermal oxidizer converts the VOC to harmless materials in a more cost efficient manner.

Thermal oxidizers are typically designed to be operated within a specified temperature range that is determined, in part, by the properties of the material flowing into the oxidizer, the desired reaction products, the quantity of material to be processed, etc. For many applications the oxidizer's normal operating temperature range is between 400° C. and 1400° C.

Packing elements of this invention are disclosed, by way of example, in FIGS. 3-11. Each of these embodiments is a single packing element which includes at least a first side, a second side, a third side, cross members and a peripheral wall. The area of a major opening is defined herein as the area bounded by the interior surfaces of the abutting cross members and the peripheral wall that encircle and therefore define the size of the opening. The first side's surface area is defined herein as the area bounded by the exterior surface of the packing element's peripheral wall when viewing the packing element in cross-section. The area of a major opening, expressed as a percentage of the first side's surface area, must be at least 10% of the first side's surface area and is determined by dividing the area of the opening by the first side's surface area. The first side has at least three major openings each having a surface area of at least 10% of the first side's surface area. Packing elements with three, four or five major openings are also feasible. A packing element with four major openings that are symmetrically disposed within the packing element and have essentially the same shape and size may be easier to manufacture than packing elements having an odd number of major openings. While packing elements having four major openings that are identically sized and shaped may provide optimum performance in certain applications, packing elements with a first major opening occupying 10% of the first side's surface area, a second major opening occupying 11% of the first side's surface area, a third major opening occupying 12% of the first side's surface area, and a fourth major opening occupying 14% of the first side's surface area are also useful. Furthermore, a bed of packing elements that includes a mixture of: packing elements having only major openings occupying 10% of the first side's surface area; packing elements having only major openings occupying 11% of the first side's surface area; and packing elements having only major openings occupying 12% of the first side's surface area may be useful in certain chemical processing apparatus.

Figures 3, 4:
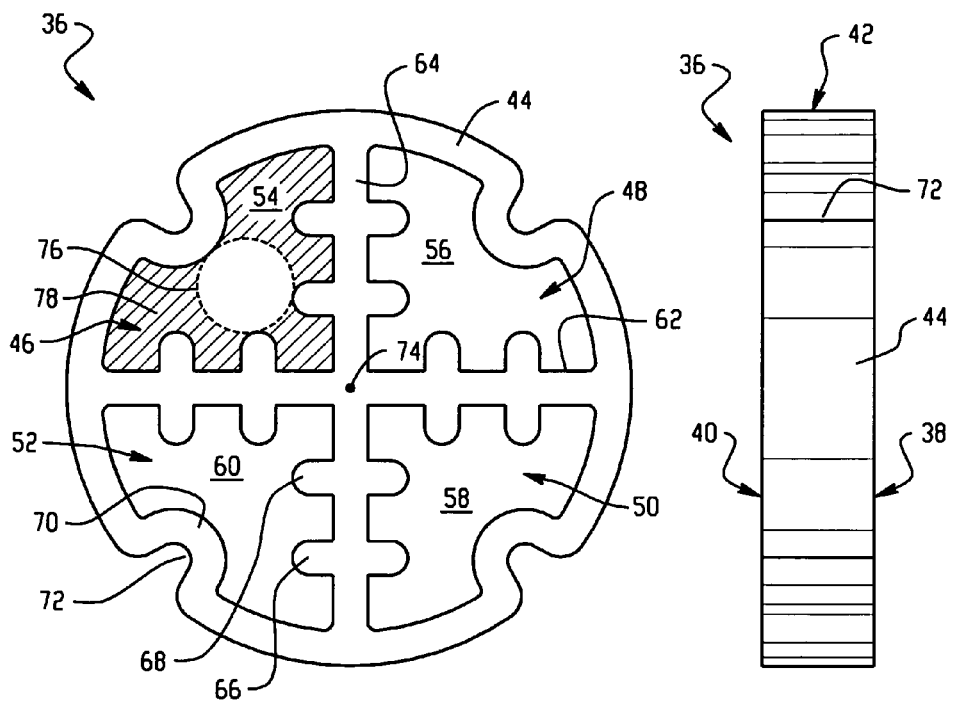
FIG. 3 is a top view of a first ceramic packing element of this invention.
FIG. 4 is a side view of a first ceramic packing element of this invention.

With reference now to a specific embodiment, FIG. 3 shows the top view of first embodiment of a heat transfer packing element 36 of this invention that is suitable for use in a thermal oxidizer. Packing element 36 includes first side 38, second side 40 and third side 42. The first and second sides are parallel to one another and perpendicular to the third side. First side 38 may also be described herein as the first end. Second side 40 may also be described herein as the second end. Third side 42 corresponds to the peripheral wall that defines the maximum diameter of the packing element. The wall abuts the first side and the second side thereby defining a volume penetrated by continuous passageways 46, 48, 50 and 52. The volume includes the cross members and peripheral wall. The continuous passageways terminate on the first side and second side of packing element 36 thereby defining four major openings, 54, 56, 58 and 60 on the first side of the element and four matching openings on the second side of the element. Each opening is partially bounded by first cross member 62 and second cross member 64, which intersect one another and peripheral wall 44. Each opening is bounded by portions of the cross members and a portion of the peripheral wall. Each cross member has eight projections, including a first projection 66 and second projection 68, that extend perpendicularly from the cross member. Projecting from the interior surface of wall 44 toward the center 74 of packing element 36 is reinforcing rib 70 which extends along the length of the peripheral wall. Four grooves 72 are located in the exterior surface of the peripheral wall. Each groove is equally spaced between intersections of a cross member and the peripheral wall.

Figure 5:
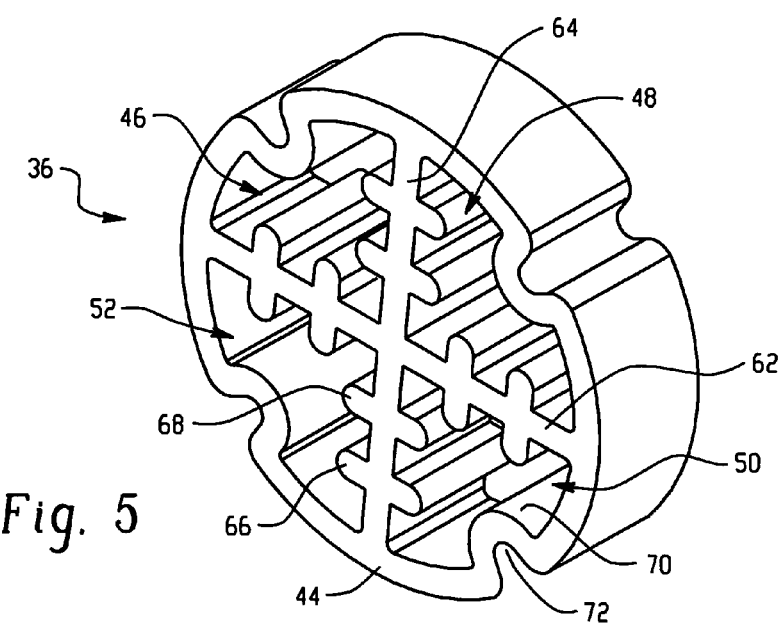
FIG. 5 is a perspective view of a first ceramic packing element of this invention.

In the embodiment shown in FIGS. 3-5, the open face surface area of each major opening is 16.50% of the first side's surface area. Within each of the major openings, there may be an unencumbered region 76 and a region that has restricted flow therethrough 78. The unencumbered region may have a circular cross-sectional shape and is defined herein as the area of the largest circle that can be circumscribed within the major opening without overlapping any portion of the packing element such as projection 66 or reinforcing rib 70. An example of an unencumbered region is represented by the dotted circle in opening 54. The portion of a major opening having restricted flow therethrough is defined herein as the area of the major opening not located within the unencumbered region. In FIG. 3, a region of restricted flow 78 in first major opening 54 is identified with crosshatching. The restricted flow region abuts the periphery of the opening which is defined by a portion of the peripheral wall and portions of the cross members.

Shown in FIGS. 6-8 is a second embodiment of a ceramic packing element 80 of this invention. The embodiment shown in FIG. 6 is identical to the embodiment shown in FIG. 3 except that first cross member 62 and second cross member 64 do not have any projections depending from them. Elimination of the projections, which are designated 66 and 68 in FIG. 3, simultaneously reduces the packing element's geometric surface area, increases the size of unencumbered region 76 and decreases the size of the restricted flow region 78.

Figures 9, 10:
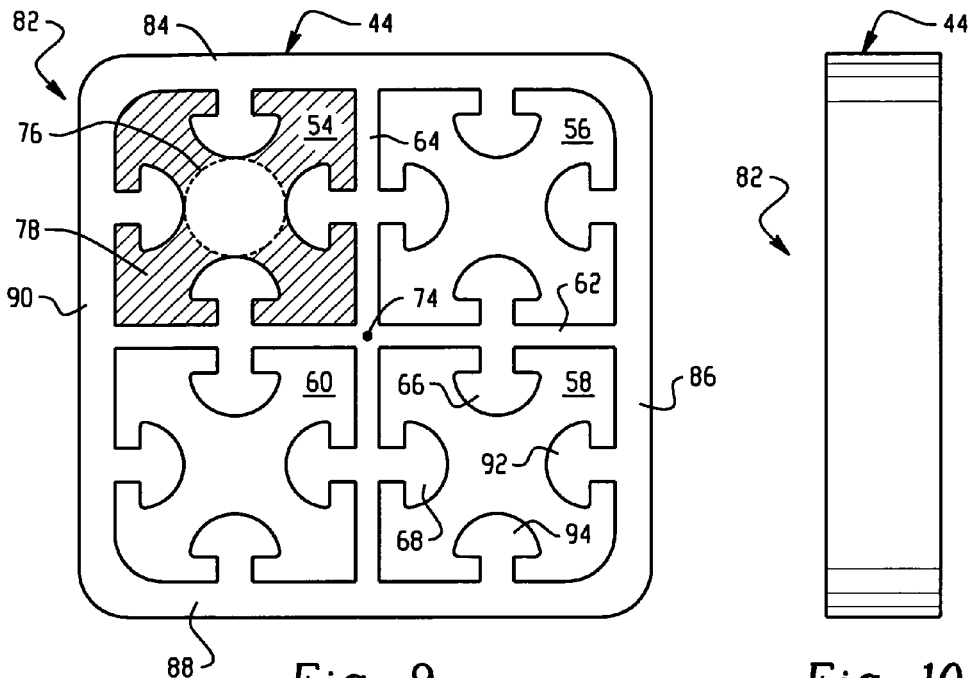
FIG. 9 is a top view of a third ceramic packing element of this invention.
FIG. 10 is a side view of a third ceramic packing element of this invention.
Figure 11:
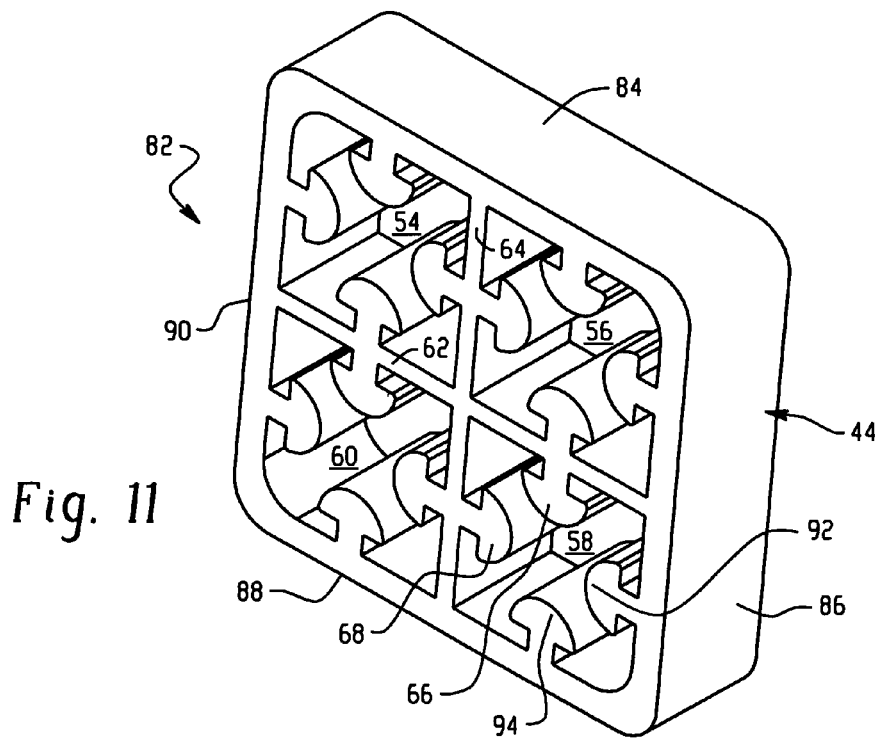
FIG. 11 is a perspective view of a third ceramic packing element of this invention.

Shown in FIGS. 9-11 is a third embodiment of a ceramic packing element 82 of this invention. In contrast to the first and second embodiments described above, peripheral wall 44 in packing element 82 forms a square having a first section 84, a second section 86, a third section 88 and a fourth section 90. Packing element 82 also includes projections 92 and 94 that extend perpendicularly from different sections of the peripheral wall as well as projections 66 and 68 that extend from first cross member 62 and second cross member 68, respectively. In major opening 54, unencumbered region 76 is represented by a dotted line and restricted flow region 78 is represented by cross hatching.

As stated above, in a packing element of this invention, an opening that occupies at least 10% of the first side's surface area is defined as a major opening. Openings that occupy 12%, 15%, 18%, 20% or some incremental point between 10% and 20%, such as 10.75%, 16.25% or 18.40%, of the first side's surface area may be suitable for particular applications. Openings that occupy less than 10% of the first side's surface area are not considered to be major openings because the openings may be easily clogged by contaminants in the feed stock. Openings greater than 20% may not be desirable because the packing element's geometric surface area may be too low to support efficient operation of the thermal reactor.

A cross member in a packing element of this invention is defined herein as a strut having a first end that abuts a first location on the peripheral wall and a second end that abuts a second location on the peripheral wall. The cross member is typically linear. In particular embodiments, the cross member may pass through the center 62 of the packing element, as shown in FIG. 3, or the cross member may function as a chord that does not pass through the center of the packing element and therefore divides the packing element into two unequal portions. Each cross member has a midpoint and the cross members may intersect one another at their midpoints which may also coincide with the center of the packing element.

The presence or number of projections extending from a single cross member is not critical and can be varied to increase or decrease the geometric surface area of the packing element. The packing element's total geometric surface area is defined herein as the total surface area of the planar and curvilinear surfaces that define the packing element's interior and exterior surfaces. Each projection may have a distal end and a proximal end. The distal end may abut the cross member. Furthermore, as disclosed in U.S. Pat. No. 6,007,915, specifically FIGS. 2A through 2D, a packing element's first and second sides may be shaped to form convex or concave surfaces rather than planar surfaces that are perpendicular to the peripheral wall.

As stated above, a packing element of this invention may include at least three openings that each occupies at least 10% of the surface area of the packing element's first side. An opening may include an unencumbered region and a restricted flow region. The purpose of the unencumbered region is to provide an unobstructed passageway through the packing element that is less likely to or takes more time to become clogged with the contaminant from the feed stock that accumulates on the element. The unencumbered region may preferably occupy at least 25% of the major opening's surface area. Unencumbered regions that occupy as little as 15% or as much as 60% of the major opening's surface area are feasible. Intermediate percentages such as 18%, 27% or 50% are also workable. The area of the restricted flow region should be less than 85% of the major opening's surface area. Packing elements having restricted flow regions that occupy 50%, 73%, or 82% of the major opening's surface area are useful. However, if the area occupied by the restricted flow region is too small, such as less than 35% of the major opening's surface area, then the contaminant begins to prematurely accumulate in the unencumbered region which is not desirable. The purpose of the restricted flow region is to slow the rate of flow of the contaminant so that the surfaces of the packing element in the restricted flow region serve as a preferred collection site for the deposition of the contaminant. By inducing the contaminant to build up on the interior surfaces of the cross members rather than accumulate in the unencumbered region, the unencumbered regions should remain open for longer periods of time than can be achieved when using conventional packing elements that typically employ openings that occupy less than 10% of the first side's surface area. By lengthening the time needed to clog the unencumbered region, the rise in pressure drop can be proportionally delayed thereby increasing the amount of time between shut downs of the reactor to replace the packing elements.

Packing elements of this invention are ceramic components that have a maximum diameter, a maximum length and the ratio of the diameter to the length is between 2:1 and 20:1. In some embodiments, the packing element is shaped like a disc. If the packing element has a circular cross-section, the maximum diameter is the element's only diameter. If the element has an oblong or multisided cross-section, the maximum diameter is defined herein as equal to twice the radius of the smallest circle that encompasses the element. Unlike monolithic packing elements that are stacked or aligned in a chemical processing apparatus and are not considered to be part of this invention, packing elements of this invention are randomly dumped into a reactor. To encourage the packing elements of this invention to align themselves in a horizontal or nearly horizontal position after they have been deposited into the reactor, the diameter of the packing element must be at least twice as large as, preferably at least three times as large as, more preferably at least four times as large as the length of the packing element. Packing elements that have a diameter to length ratio between 2:1 and 20:1 are feasible. Packing elements that have a diameter to length ratio between 3:1 and 9:1, more preferably between 4:1 and 7:1, are believed to provide the highest percentage of horizontal orientation.

EXAMPLES

A plurality of packing elements having the physical configurations shown in FIGS. 3-5, 6-8 and 9-11 were manufactured by forming a malleable mixture of ceramic materials and water as previously described. The mixture was then extruded through a die having the number and size of openings needed to produce a continuous, elongated extrudate that was cut to produce unfired packing elements having the D/L ratio shown in Table 1 and the shape disclosed in FIGS. 3-5, 6-8 or 9-11. The elements were then dried and fired thereby forming ceramic packing elements having the desired shapes.

Physical characteristics of each packing element are shown in Table 1.

TABLE 1

| | Embodiments shown in | | |
|---|---|---|---|
| | FIG. 3-5 | FIG. 6-8 | FIG. 9-11 |
| Maximum Diameter (cm) | 15.88 | 15.88 | 21.56* |
| Maximum Length (cm) | 3.56 | 3.18 | 3.56 |
| Ratio of D/L | 4.46 | 5.00 | 6.06 |
| Surface area of first side (cm$^2$) | 197.87 | 197.87 | 232.26 |
| Surface area of major opening (cm$^2$) | 32.64 | 30.90 | 29.03 |
| Surface area of major opening as a percentage of the surface area of the first side | 16.50 | 15.61 | 12.50 |
| Area of unencumbered region (cm$^2$) | 8.81 | 15.45 | 5.23 |
| Area of restricted flow (cm$^2$) | 23.83 | 15.45 | 23.80 |
| Area of unencumbered region as a percentage of the surface area of the major opening | 27 | 50 | 18 |
| Area of restricted flow as a percentage of the surface area of the major opening | 73 | 50 | 82 |
| Geometric Surface Area (cm$^2$) | 795.05 | 626.94 | 1105.27 |

*each side measured 15.24 cm

While some of the embodiments described above are particularly useful in industrial processes wherein the packing elements are used to facilitate heat transfer, packing elements of this invention may also be well suited for use in mass transfer processes. Within the field of mass transfer processes, an individual chemical processing apparatus may be designed for high capacity mass transfer or high efficiency mass transfer. The exact dimensions of the packing elements of this invention can be tailored to achieve the desired objective within the mass transfer reactor.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law.

We claim:

1. A ceramic packing element, comprising: a width to length ratio between 2:1 and 20:1; at least three sides; and at least three continuous passageways disposed through the element, said passageways defining at least three openings in a first of said sides and each opening occupies at least 10% of said first side's surface area, wherein said at least three sides comprise a first end which corresponds to a first side, a second end which corresponds to a second side, and a peripheral wall which corresponds to a third side and abuts said first end and said second end, said wall defining the element's maximum length and said first end defining the element's maximum width, wherein said wall and said ends cooperate to define a volume penetrated by said passageways and bounded by said wall and said ends, said element further comprising at least a first cross member and a second cross member disposed within the volume, said wall and cross members cooperating to define said passageways and wherein each opening comprises a first linear projection and a second projection extending from one of said cross members.

2. The ceramic packing element of claim 1 wherein said element comprises at least four openings and wherein each of said four openings occupies at least 10% of said first side's surface area.

3. The ceramic packing element of claim 1 wherein said element comprises no more than five openings in said first of said sides.

4. The ceramic packing element of claim 1 wherein each opening abuts a cross member and the peripheral wall.

5. The ceramic packing element of claim 4 wherein each opening abuts only a cross member and the peripheral wall.

6. The ceramic packing element of claim 1 wherein each opening represents at least 15% of said first side's surface area.

7. The ceramic packing element of claim 1 wherein each opening represents at least 20% of said first side's surface area.

8. The ceramic packing element of claim 1 wherein each opening comprises an unencumbered region and at least one restricted flow region.

9. The ceramic packing element of claim 8 wherein said opening comprises a periphery and said restricted flow region abuts the periphery of the opening.

10. The ceramic packing element of claim 8 wherein the unencumbered region represents at least 15% of said opening's surface area.

11. The ceramic packing element of claim 8 wherein the unencumbered region has a circular cross-sectional surface area.

12. The ceramic packing element of claim 11 wherein said first cross member and said second cross member intersect one another.

13. The ceramic packing element of claim 12 wherein said element has a center and said first and second cross members intersect one another at the center of said element.

14. The ceramic packing element of claim 13 wherein said first and second cross members each have midpoints and said members intersect at their midpoints and are perpendicular to one another.

15. The ceramic packing element of claim 1 wherein said at least three openings have essentially the same shape.

16. The ceramic packing element of claim 1 wherein said projections extend perpendicularly from one of said cross members.

17. The ceramic packing element of claim 16 wherein each projection comprises a distal end and a proximal end, said distal end abutting one of said cross members.

18. The ceramic packing element of claim 1 further comprises an inwardly depending rib that extends longitudinally along said wall from said first end to said second end.

19. The ceramic packing element of claim 1 wherein said ratio of width to length is between 3:1 and 9:1.

20. The ceramic packing element of claim 1 wherein said ratio of width to length is between 4:1 and 7:1.

21. A chemical processing apparatus comprising a plurality of randomly oriented ceramic packing elements, the majority of said elements each comprising a width to length ratio between 2:1 and 20:1; at least three sides; and at least three continuous passageways disposed through the element, said passageways define at least three openings in a first of said sides and each opening occupies at least 10% of said first side's surface area, wherein said at least three sides comprise a first end which corresponds to a first side, a second end which corresponds to a second side, and a peripheral wall which corresponds to a third side and abuts said first end and said second end, said wall defines the element's maximum length and said first end defines the element's maximum width, wherein said wall and said ends cooperate to define a volume penetrated by said passageways and bounded by said wall and said ends, said element further comprising at least a first cross member and a second cross member disposed within the volume, said wall and cross members cooperating to define said passageways, and wherein each opening comprises a first linear projection and a second linear projection extending from one of said cross members.

22. The chemical processing apparatus of claim 21 comprising at least a first bed and a second bed of ceramic components.

23. The chemical processing apparatus of claim 21 comprising a feedstock which contains contaminants that yield nonvolatile residue under reaction conditions.

24. The chemical processing apparatus of claim 23 wherein said nonvolatile residue comprises silicon.

25. The chemical processing apparatus of claim 24 wherein said nonvolatile residue comprises silica.

26. The chemical processing apparatus of claim 25 wherein said nonvolatile residue comprises amorphous silica.

27. The chemical processing apparatus of claim 21 wherein said element comprises four openings wherein each opening occupies at least 10% of said first side's surface area.

28. The chemical processing apparatus of claim 21 wherein said element comprises no more than five openings in said first of said sides.

29. The chemical processing apparatus of claim 21 wherein each opening abuts a cross member and the peripheral wall.

30. The chemical processing apparatus of claim 29 wherein each opening abuts only a cross member and the peripheral wall.

31. The chemical processing apparatus of claim 21 wherein each opening represents at least 15% of said first side's surface area.

32. The chemical processing apparatus of claim 21 wherein each opening represents at least 20% of said first side's surface area.

33. The chemical processing apparatus of claim 21 wherein each opening comprises an unencumbered region and at least one restricted flow region.

34. The chemical processing apparatus of claim 33 wherein said opening comprises a periphery and said restricted flow region abuts the periphery of the opening.

35. The chemical processing apparatus of claim 33 wherein the unencumbered region represents at least 15% of said opening's surface area.

36. The chemical processing apparatus of claim 35 wherein the unencumbered region has a circular cross-sectional surface area.

37. The chemical processing apparatus of claim 21 wherein said first cross member and said second cross member intersect one another.

38. The chemical processing apparatus of claim 21 wherein said element has a center and said first and second cross members intersect one another at the center of said element.

39. The chemical processing apparatus of claim 37 wherein said first and second cross members each have midpoints and said members intersect at their midpoints and are perpendicular to one another.

40. The chemical processing apparatus of claim 21 wherein said at least three openings have essentially the same shape.

41. The ceramic packing element of claim 21 wherein said projections extend perpendicularly from one of said cross members.

42. The ceramic packing element of claim 41 wherein each projection comprises a distal end and a proximal end, said distal end abutting one of said cross members.

43. The ceramic packing element of claim 21 further comprises an inwardly depending rib that extends longitudinally along said wall from said first end to said second end.

44. The ceramic packing element of claim 21 wherein said ratio of width to length is between 3:1 and 9:1.

45. The ceramic packing element of claim 21 wherein said ratio of width to length is between 4:1 and 7:1.

* * * * *